United States Patent [19]

Narita

[11] Patent Number: 4,912,563
[45] Date of Patent: Mar. 27, 1990

[54] ELECTROPHOTOGRAPHIC IMAGE FORMING APPARATUS HAVING REPLACEABLE OPTICAL UNIT

[75] Inventor: Masaki Narita, Tokyo, Japan
[73] Assignee: Ricoh Company, Ltd., Tokyo, Japan
[21] Appl. No.: 213,778
[22] Filed: Jun. 30, 1988
[30] Foreign Application Priority Data Jul. 4, 1987 [JP] Japan .................................. 62-167610

[51] Int. Cl.⁴ ............................................. H04N 1/00
[52] U.S. Cl. .................................... 358/401; 355/200; 355/210; 355/211
[58] Field of Search ............ 355/3 DR, 3 R; 358/256, 358/400, 401, 414, 474, 475, 493, 296; 355/210, 211, 232, 233, 200

[56] References Cited

U.S. PATENT DOCUMENTS

| 4,236,807 | 12/1980 | Kuehnle | 355/210 |
| 4,327,992 | 5/1982 | Babicz | 355/3 DR |
| 4,511,237 | 4/1985 | Kawata | 355/3 R |
| 4,598,993 | 7/1986 | Mizutani | 355/3 DR |
| 4,668,072 | 5/1987 | Yasuda | 355/211 |
| 4,692,018 | 9/1987 | Tamura | 355/3 R |
| 4,708,455 | 11/1987 | Kubota | 355/3 R |
| 4,757,344 | 7/1988 | Idenawa | 355/3 R |

FOREIGN PATENT DOCUMENTS 95419 1/1985 Japan .

Primary Examiner—Edward L. Coles, Sr.
Assistant Examiner—Jerome Grant
Attorney, Agent, or Firm—Oblon, Spivak, McClelland, Maier & Neustadt

[57] ABSTRACT

An image forming apparatus forms an image described by an input image information on a recording sheet by electrophotography. An optical unit of the image forming apparatus is replaceable while maintaining an accurate positional relationship with a photosensitive unit when the optical unit is set in the image forming apparatus. The optical unit is automatically and accurately positioned three-dimensionally with respect to the photosensitive unit when the optical unit is set in the image forming apparatus.

25 Claims, 18 Drawing Sheets

FIG.17
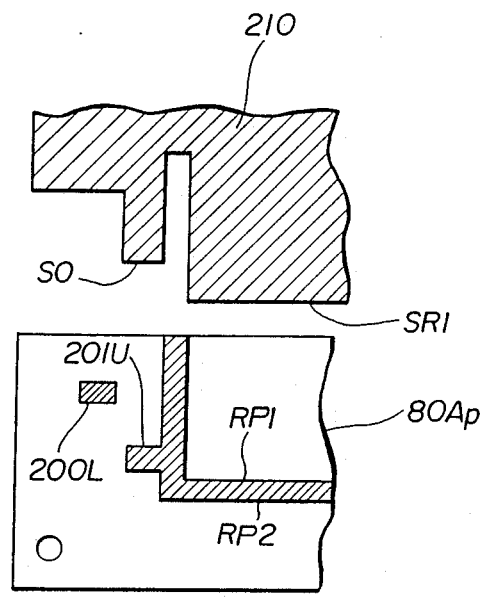
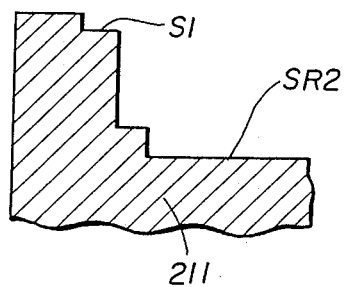

ELECTROPHOTOGRAPHIC IMAGE FORMING APPARATUS HAVING REPLACEABLE OPTICAL UNIT

BACKGROUND OF THE INVENTION

1. Field of the Invention

The present invention generally relates to image forming apparatuses, and more particularly to an image forming apparatus in which an optical scanning device and the like thereof are easily replaceable.

2. Background of the Related Art

As one example of the image forming apparatus, FIG. 1 shows a cross sectional view of a conventional laser printer such as that shown in Japanese Laid-Open Patent Application No. 60-95419. The laser printer generally comprises a photosensitive drum 1, a transfer charger 2, a charger unit 3, a discharge lamp 4, a developing part 5, a cleaning part 6, a toner cartridge 7, an optical scanning device 8, a paper supplying part 9, a fixing part 10, an ejecting paper switching part 11, a paper reversing part 12, an ejecting paper transport path part 13, paper supplying cassettes 14a and 14b, and paper trays 15a and 15b.

When a fault occurs during a paper ejecting operation, the ejecting paper transport path part 13 is opened as indicated by an arrow A so that the user may correct the fault. However, the conventional laser printer is designed with priority on the functions thereof over other features. In other words, when designing the laser printer, essentially no consideration is given to facilitate replacement of parts, removal of parts, and disassembling of parts. Because the design of the laser printer is function oriented, the construction and arrangement of the parts make it difficult to replace, remove and disassemble the parts of the laser printer.

For example, the quality of the recording made by the laser printer becomes poor when the optical scanning device 8 is not positioned correctly with respect to the photosensitive drum 1. For this reason, measures are taken so that the optical scanning device 8 is not easily removable.

FIG. 2 shows a perspective view of the optical scanning device 8 together with the photosensitive drum 1 which rotates in a sub scan direction. The optical scanning device 8 generally comprises an optical housing 800 which is mounted on a base plate 802. A polygonal mirror 803, a plurality of imaging lenses 804 arranged on an optical axis of a laser beam, a mirror 805 for detecting a horizontal synchronizing signal, a semiconductor laser 806, an optical connector 807 for making a connection with an optical fiber 807A which receives a reflected beam from the mirror 805, a lead connector 808 for the polygonal mirror 803 and a protective glass 809 for protecting the inside of the optical housing 800 from dust particles and the like. The optical connector 807, a connector of the semiconductor laser 806, the lead connector 808 of the polygonal mirror 803 and the like extend in various directions from side walls of the optical housing 800. Although not shown, a cover is mounted on the optical housing 800 by mounting screws for the purpose of preventing the laser beam from leaking to the outside and also to prevent dust particles and the like from entering the optical housing 800. To meet safety requirements, the cover cannot be removed by the user or the serviceman.

The optical housing 800 is mounted on the base plate 802 by at least four mounting screws 801. The optical housing 800 is fixed in position relative to the base plate 802 perpendicularly to an optical scanning plane (main scan direction A) of the laser beam. In order to remove the optical housing 800, it is necessary to pull the optical housing 800 in a direction B in FIG. 2, that is, in a direction along the height of the optical housing 800. For this reason, a space for accommodating the optical housing 800 in the laser printer needs to have a height greater than the height of the optical housing 800. But in the laser printer, parts such as the paper trays 15a and 15b exist above the optical housing 800 in the direction B, and these parts are fit from various directions making it virtually impossible to remove the optical housing 800 unless other parts in the way are first removed.

Generally, the laser printer has such a construction that the area occupied in the plan view is considerably large compared to the area occupied in the side view. In other words, the height of the laser printer is small compared to the width or depth thereof, and it is undesirable from the positional relationship of the optical housing 800 with respect to the neighboring parts to remove the optical housing 800 in the direction along the height thereof.

The laser printer described heretofore, a copying machine and the like which use the electrophotography method basically carry out the same process except for the respective optical systems. Each of these types of apparatuses require the supply of the toner, and use units which require replacement after the serviceable lives thereof end. Examples of such units are the photosensitive unit, the developing unit, the cleaning unit and the charger unit.

Some of these types of apparatuses not only enable the supply of the toner by the user, but also have user-replaceable photosensitive unit and cleaning unit. The demand for enabling the maintenance of the apparatus by the user is strong especially for the printer, and it is becoming important that various units are easily user-replaceable.

An example of the conventional apparatus of this type has a replaceable assembly integrally comprising the photosensitive unit, the developing unit, the cleaning unit and the like. When the serviceable life of one of the units ends, the whole replaceable assembly is replaced by a new replaceable assembly. However, the serviceable lives of the units of the replaceable assembly mutually differ because the wear of each unit depends on the characteristic conditions in which the apparatus is used. Hence, when the serviceable life of one unit ends, it is possible that the remaining units of the replaceable assembly can still be used for a relatively long time. But in this type of apparatus using the replaceable assembly, the whole replaceable assembly must be replaced by a new replaceable assembly when the serviceable life of one of the units ends even though the remaining units can still be used. Therefore, there is a problem in that the running cost of the apparatus is high since all of the units of the replaceable assembly are changed when the serviceable life of one of the units ends.

In order to eliminate the problem of the apparatus above described, there has been proposed an apparatus which enables the cleaning unit, the developer unit, the photosensitive unit and the like to each be independently replaced by a new unit when the serviceable lie thereof ends. In other words, only the unit with no more serviceable life is replaced by a new unit. There are generally two methods of making the units of the apparatus independently replaceable.

According to a first method, each unit is independently removed from the apparatus and replaced by a new unit. Hence, a mechanism is provided for each unit so that the unit can be easily pulled out by the user for the replacement. But each unit must be accurately positioned with respect to the other units, and from this point of view, it is undesirable to make each unit independently removable. In addition, each unit is accommodated within a limited small space in the apparatus, and it is extremely difficult for the user to work within the small space. Because of the small space in which the user must work to replace the unit, the unit being removed or the new unit being set may hit and damage other units which can still be used. In an extreme case, the toner may be spilled which would considerably damage the inside of the apparatus.

On the other hand, according to a second method, a pull-out module integrally comprises the units having mutually different serviceable lives. When one unit of the pull-out module needs to be replaced by a new unit, the entire pull-out module is pulled out from the apparatus, and only the unit having no more serviceable life is replaced by the new unit. Each unit is accurately positioned with respect to the other units in the pull-out module, and the positional relationship of the units is maintained when the pull-out module is pulled out from the apparatus. But because the units are accurately positioned within the pull-out module, it is difficult to remove the units from the pull-out module. Accordingly, there are problems in that the user may spill the toner, and damage the photosensitive unit and the like when replacing one unit of the pull-out module.

It is possible to make the units easily removable from the image forming apparatus, but in this case, the positioning of the units becomes unsatisfactory and the positional relationship of the units cannot be accurately maintained. The accurate positioning of the units related to the optical system of the image forming apparatus is essential in order to form an image of a satisfactory picture quality. On the other hand, then measures are taken to accurately maintain the positional relationship of the units, the removal of the units becomes extremely difficult as described before, and the possibility of damaging other parts of the image forming apparatus increases when replacing the unit. For these reasons, no image forming apparatus has been proposed with a replaceable optical unit (or module).

Further, the cover of the optical unit cannot be removed by the user or the serviceman to meet the safety requirements as described before. As a result, the optical unit cannot be repaired unless the entire image forming apparatus is taken to a repair station. From this point of view, it would be very useful if the optical unit were easily replaceable while maintaining the strict positional relationship with the other units of the image forming apparatus.

SUMMARY OF THE INVENTION

Accordingly, it is a general object of the present invention to provide a novel and useful image forming apparatus in which the problems described heretofore are eliminated.

Another and more specific object of the present invention is to provide an image forming apparatus for forming an image described by input image information on a recording sheet by electrophotography, in which an optical unit is replaceable while maintaining an accurate positional relationship with a photosensitive unit when the optical unit is set in the image forming apparatus. According to the image forming apparatus of the present invention, the optical unit is automatically and accurately positioned three-dimensionally with respect to the photosensitive unit when the optical unit is set in the image forming apparatus.

Still another object of the present invention is to provide an image forming apparatus in which the replaceable optical unit set in the image forming apparatus and the photosensitive unit are positioned with reference to a common frame of the image forming apparatus. According to the image forming apparatus of the present invention, it is possible to maintain a desired positional relationship between the replaceable optical unit and the photosensitive unit with a high precision.

A further object of the present invention is to provide an image forming apparatus in which the replaceable optical unit has such a structure that the insertion and extraction thereof is facilitated.

Another object of the present invention is to provide an image forming apparatus in which the replaceable optical unit is inserted in and extracted from the image forming apparatus along a predetermined direction by a sliding action. According to the image forming apparatus of the present invention, the insertion and extraction of the replaceable optical unit can be carried out within a small space, and i is unnecessary to provide an extra space in the image forming apparatus for enabling the removal of the optical unit.

Still another object of the present invention is to provide an image forming apparatus in which the photosensitive unit is also replaceable, and a first direction in which the replaceable optical unit is inserted in extracted from the image forming apparatus and a second direction in which the replaceable photo-sensitive unit is inserted in and extracted from the image forming apparatus are perpendicular to each other. According to the image forming apparatus of the present invention, it is possible to accurately maintain the positional relationship between the replaceable optical unit and the replaceable photosensitive unit when these units are set in the image forming apparatus. In addition, the insertion and extraction of the replaceable optical unit and the photosensitive unit can be carried out with ease because these units are inserted and extracted in directions perpendicular to each other.

A further object of the present invention is to provide an image forming apparatus in which predetermined surfaces of the replaceable optical unit which determine the positioning thereof with respect to the photosensitive unit are molded from dies simultaneously with the formation of reference planes on which lenses, mirrors and the like are positioned in the replaceable optical unit. According to the image forming apparatus of the present invention, because the predetermined surfaces are molded by the same dies, the predetermined surfaces can be formed with a high precision with respect to the lenses, mirrors and the like which are positioned with reference to the reference planes as compared to the case where the predetermined surfaces are formed afterwards in a process subsequent to the formation of the reference planes.

Another object of the present invention is to provide an image forming apparatus in which one or a plurality of connectors for transmitting and receiving signals including the input image information is located at one of front, side and rear surfaces of the replaceable optical unit. According to the image forming apparatus of the present invention, the setting and removal of the replaceable optical unit to and from the image forming apparatus is facilitated by the provision of the connectors at one location.

Other objects and further features of the present invention will be apparent from the following detailed description when read in conjunction with the accompanying drawings.

BRIEF DESCRIPTION OF THE DRAWINGS

FIG. 17 is a cross sectional view of the portion along a line XVII—XVII in FIG. 16 together with upper and lower dies for explaining the formation of the groove by a molding process;

DETAILED DESCRIPTION OF THE PREFERRED EMBODIMENTS

Figure 1:
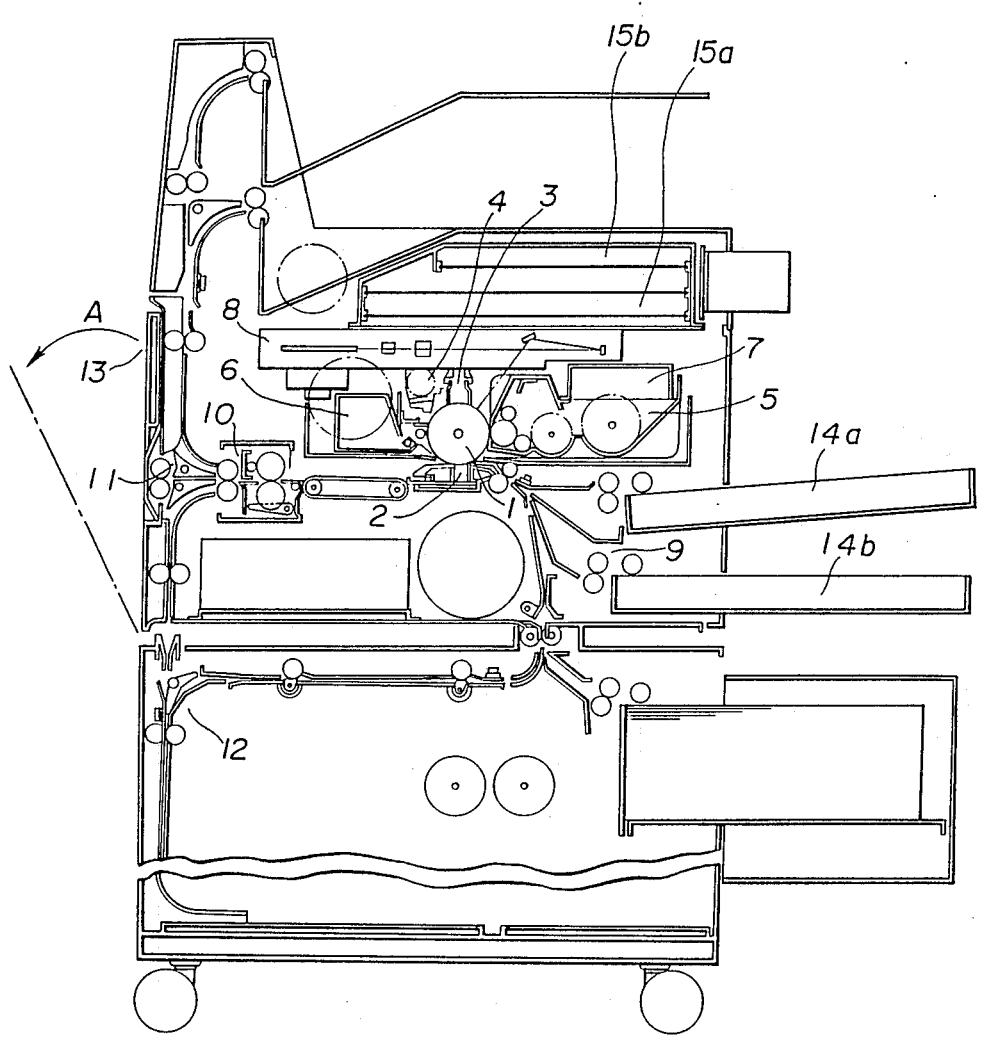
FIG. 1 is a cross sectional view showing an example of the conventional laser printer.
Figure 2:
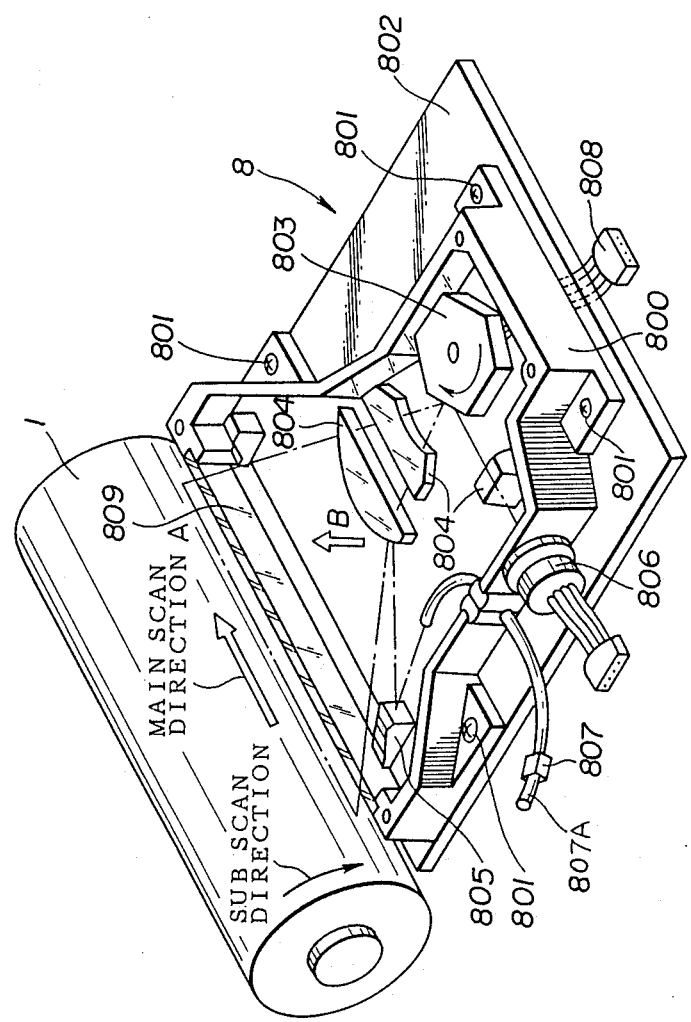
FIG. 2 is a perspective view showing an optical housing of the conventional laser printer together with a photosensitive drum.
Figure 3:
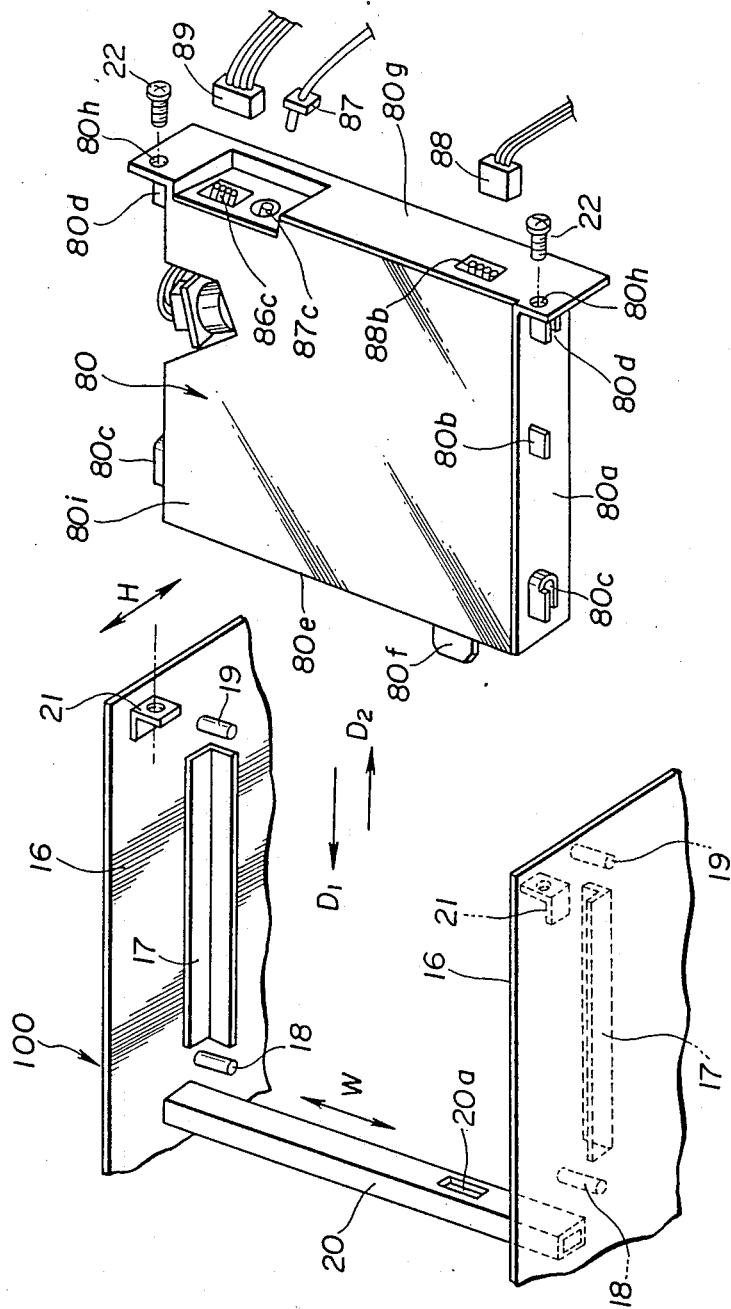
FIG. 3A is a perspective view showing a receiving part of a first embodiment of the image forming apparatus according to the present invention for receiving an optical unit.
FIG. 3B is a perspective view showing the optical unit received by the receiving part shown in FIG. 3A.

FIG. 3A shows a receiving part 100 of a first embodiment of the image forming apparatus according to the present invention for receiving an optical unit 80 shown in FIG. 3B. The parts shown in FIGS. 3A and 3B constitute an essential part of the present invention.

The receiving par 100 shown in FIG. 3A comprises a pair of side plates 16 connected by a stay 20. A guide rail 17 is provided on an inner surface of each of the side plates 16 and studs 18 and 19 are located on both sides of the guide rail 17. The studs 18 and 19 comprise second and first positioning parts, respectively, and have an approximately cylindrical shape. For example, centers of the studs 18 and 19 are slightly higher than an upper surface of the guide rail 17 in a direction H along the height of the receiving part 100. The stud 18 positions the optical unit 80 in the direction H, while the stud 19 positions the optical unit 80 both in the direction H and in inserting and extracting directions D1 and D2 in which the optical unit 80 is inserted into and extracted from the receiving part 100. The stay 20 has at least one hole 20a for positioning the optical unit 80 in a direction W along the width of the receiving part 100. An L-shaped member 21 provided with a screw hole for receiving a mounting screw 22 is provided on the inner surface of each of the side plates 16 in a vicinity of the stud 19. The L-shaped member 21 is located at such a position on the side plate 16 that a gap gl is formed between the L-shaped member 21 and a rear surface of a front plate 80g of the optical unit 80, as will be described in conjunction with FIG. 5A, when the optical unit 00 is inserted into the receiving part 100 and secured by the mounting screws 22.

The optical unit 80 has an approximately rectangular shape and comprises a pair of side plates 80a, a rear plate 80e, the front plate 80g and a top plate 80i which covers the inside of the optical unit 80. A rib 80b for sliding on the guide rail 17 of the receiving part 100 and element forming grooves 80c and 80d for receiving the respective studs 18 and 19 of the receiving part 100 re provided on an outer surface of each of the side plates 80a. The grooves 80c and 80d are defined by approximately U-shaped surfaces and comprise fifth and fourth positioning parts, respectively. A projection 80f is provided on an outer surface of the rear plate 80e for engaging the hole 20a in the stay 20 of the receiving part 100 and comprise a sixth positioning part. A hole 80h is provided on both sides of the front plate 80g for receiving the mounting screws 22 which are screwed into the L-shaped members 21 of the receiving part 100.

Figure 4:
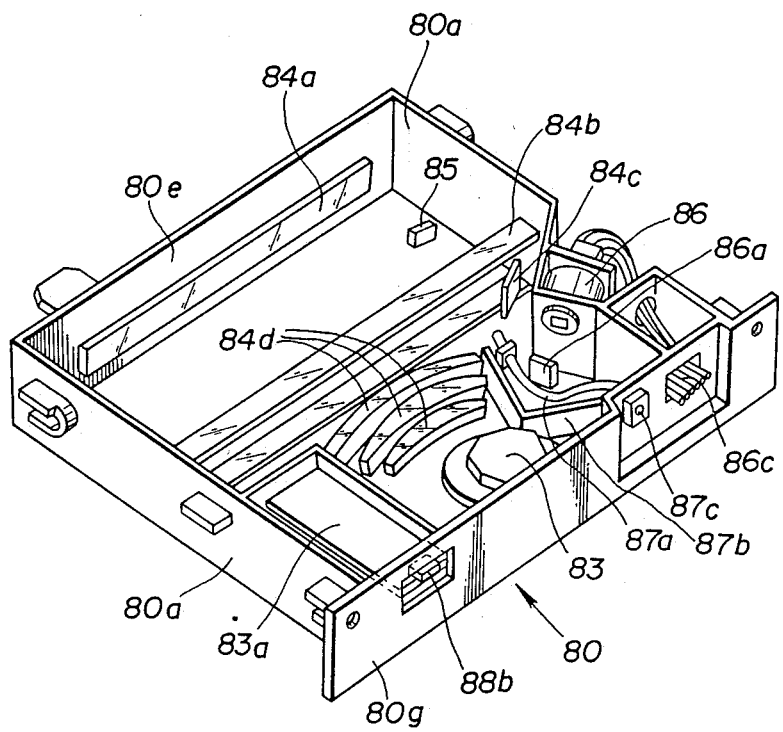
FIG. 4 is a perspective view showing the optical unit shown in FIG. 3B with a top plate thereof removed.

FIG. 4 is a perspective view showing the optical unit 80 with the top plate 80i thereof removed. A polygonal mirror 83, a driving circuit board 83a for the polygonal mirror 83, first through third mirrors 84a through 84c, Fθ-lenses 84d, a fourth mirror 85, a semiconductor laser 86, a optical fiber 87a, a shield plate 87b and the like are provided inside the optical unit 80. The polygonal mirror 83 is located at a central part of the optical unit 80 along the direction W and in a vicinity of the front plate 80g. The first through third mirrors 84a through 84c and the Fθ-lenses 84d are arranged in a sequence from the rear plate 80e in the direction D2 at predetermined intervals. In other words, these first through third mirrors 84a through 84c and the Fθ-lenses 84d are arranged in the direction of a horizontal scanning optical axis of the polygonal mirror 83.

The fourth mirror 85 for detecting the horizontal synchronizing signal is arranged adjacent to one of the side plates 80a between the first and second mirrors 84a and 84b. The optical fiber 87a is located at such a position that one end thereof receives a reflected light beam from the fourth mirror 85, and the other end of the optical fiber 87a connects to an optical connector 87c. Hence, the necessary connection to a predetermined part of the image forming apparatus can be made with ease by connecting a connector 87 to the optical connector 87c.

On the other hand, the conventional optical fiber provided for the detection of the horizontal synchronizing signal simply extends out of the optical unit and an optical connector on the end of the optical fiber must be connected to a predetermined part of the image forming apparatus. This means that the connection and disconnection of the optical connector to and from the predetermined part of the image forming apparatus is extremely difficult to perform when the predetermined part is located at an inner portion of the image forming apparatus. But according to the present embodiment, such connection and disconnection can be performed with ease at the optical connector 87c located at the front plate 80g.

The semiconductor laser 86 is provided in a groove portion of one of the side plates 80a and emits a laser beam obliquely to a mirror surface of the polygonal mirror 83. A cylindrical lens 86a is located on an optical axis of the laser beam emitted from the semiconductor laser 86 and converges the laser beam of the mirror surface of the polygonal mirror 83.

The driving circuit board 83a of the polygonal mirror 83 is provided at a corner portion defined by the front plate 80g and the other of the side plates 80a having no groove portion. When directing the laser beam from the fourth mirror 85 to the optical connector 87c, the laser beam may travel straight and leak outside the optical unit 80. The shield plate 87b is provided to prevent such a leakage of the laser beam.

A connector 86c is connected to the semiconductor laser 86 through cables, and a connector 88b is electrically connected to the driving circuit board 83a. The connectors 86c and 87c are provided within a recess of the front plate 80g, while the connector 88b is provided within another recess of the front plate 80g. Hence, the connectors 86c, 87c and 88b do not project from the outer surface of the front plate 80g, thereby preventing these connectors from being damaged when the optical unit 80 is put on the floor with the front plate 80g facing down, for example. Connectors 89, 87 and 88 connect to the connectors 86c, 87c and 88b, respectively. All of the connectors 86c, 87c and 88b are located at the front plate 880g, and the corresponding connectors 89, 87 and 88 are inserted into the recesses of the front plate 80g when connected to the respective connectors 86c, 87c and 88b the optical unit 80.

Although the connectors 86c, 87c and 88b of the optical unit 80 are located at the front plate 80g in the present embodiment, it is possible to provide these connectors at the rear plate 80e.

Because the driving circuit board 83a is provided within the optical unit 80, the necessary electrical connections for controlling a motor (not shown) which drives the polygonal mirror 83 to synchronize the scanning and the like are all made at the driving circuit board 83a within the optical unit 80. For this reason, only an extremely small number of pins are required in the connector 88b, that is, mainly for supplying a power source voltage to the driving circuit board 83a.

In the case where the connectors 86c, 87c and 88b of the optical unit 80 are coupled to computer, for example, the image forming apparatus can be used as a printer. On the other hand, when the connectors 86c, 87c and 88b are coupled to an optical scanning device, the image forming apparatus can be used as a copying machine, and the image forming apparatus can be used as a facsimile machine by further adding an information transmitting and receiving function.

Figure 5A:
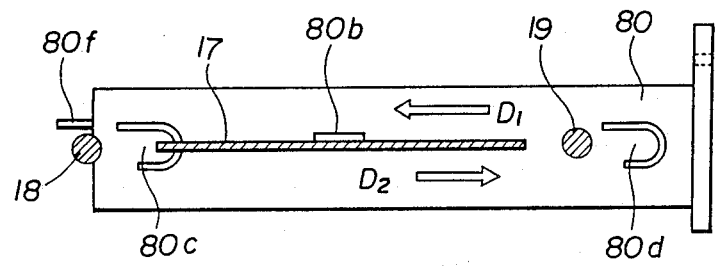
FIGS. 5A and 5B are side views in partial cross section respectively showing essential parts of the optical unit and the receiving part of the first embodiment for explaining the insertion and extraction of the optical unit.
Figure 5B:
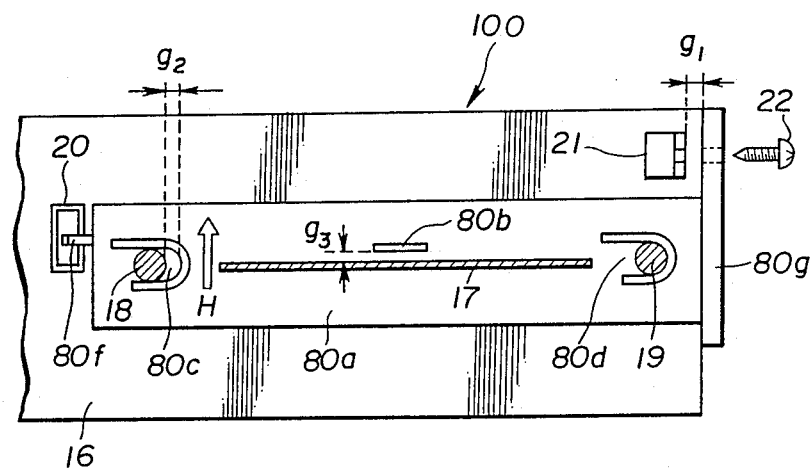

Next, a description will be given on the insertion and extraction of the optical unit 80 to and from the receiving part 100 of the image forming apparatus, by referring to FIGS. 5A and 5B. FIG. 5A shows the positional relationship of the receiving part 100 and the optical unit 80 in a state before the optical unit 80 is inserted fully into the receiving part 100 in the direction D1 (or partially extracted from the receiving part 100 in the direction D2). FIG. 5B shows the positional relationship of the receiving part 100 and the optical unit 80 in a state where the optical unit 80 is inserted into a fully inserted position in the receiving part 100 and is set in a position to carry out its function in the image forming apparatus.

When the optical unit 80 is inserted into the receiving part 100 in the direction D1 with the rib 80b sliding on and guided by the guide rail 17 as shown in FIG. 5A, the grooves 80c and 80d engage the studs 18 and 19, respectively. The groove 80c is located at such a position that a gap g2 is formed between the outer periphery of the stud 18 and the innermost portion of the groove 80c when the optical unit 80 is inserted into the fully inserted position in the receiving part 100 while the stud 19 fits into the innermost portion of the groove 80d. Hence, the engagement of the groove 80d and the stud 19 which carries out the positioning of the optical unit 80 in the direction D1 is facilitated.

In addition, the rib 80b and the guide rail 17 are separated by a gap g3 when the optical unit 80 is inserted into the fully inserted position in the receiving part 100 as shown in FIG. 5B, and the studs 18 and 19 carry out the positioning of the optical unit 80 in the direction H. The positioning of the optical unit 80 in the direction H is determined by the diameters of the studs 18 and 19 and the dimension and location of the grooves 80c and 80d. Due to the provision of the gap g3, the accuracy required of the dimension and location of the guide rails 17 and the ribs 80b need not be very high, thereby facilitating the production of the receiving part 100 and the optical unit 80.

On the other hand, the projection 80f of the optical unit 80 fits into the hole 20a in the stay 20 of the receiving part 100 as shown in FIG. 5B when the optical unit 80 is inserted into the fully inserted position in the receiving part 100. In other words, the hole 20a carries out the positioning of the optical unit 80 in the direction W.

Therefore, when the optical unit 80 is inserted into the fully inserted position in the receiving part 100, the optical unit 80 is automatically positioned three-dimensionally with respect to the image forming apparatus. In other words, the optical unit 80 is automatically positioned with respect to the image forming apparatus in the directions D1, H and W along the depth, height and width of the optical unit 80 by the cooperation of the parts of the optical unit 80 and the receiving part 100. In this state, the gap gl is formed between the L-shaped member 21 and the rear surface of the front plate 80g. For this reason, when the optical unit 80 is secured on the receiving part 100 by the mounting screws 22 which are screwed into the screw holes of the L-shaped members 21 through the holes 80h in the front plate 80g, the positioning of the optical unit 80 in the direction D1 is unaffected thereby.

When removing the optical unit 80 from the receiving part 100, the operations above described are performed in a reverse sequence. In other words, the mounting screws 22 are loosened, and the optical unit 80 is extracted in the direction D2 with the rib 80b sliding on and guided by the guide rail 17. In this state, the positional relationship of the optical unit 80 and the receiving part 100 is also as shown in FIG. 5A, and the optical unit 80 can easily be removed from the receiving part 100 of the image forming apparatus.

Next, a description will be given of the first embodiment of the image forming apparatus as a whole. It will be assumed for convenience sake that the image forming apparatus of the present embodiment is a laser printer and also enables easy and accurate replacement of parts of the image forming unit such as the photosensitive unit, the developing unit, the cleaning unit and the like. For example, this embodiment of the image forming apparatus can be applied to non-impact printers employing the electrophotography method, copying machines, facsimile machines and the like.

Figure 6:
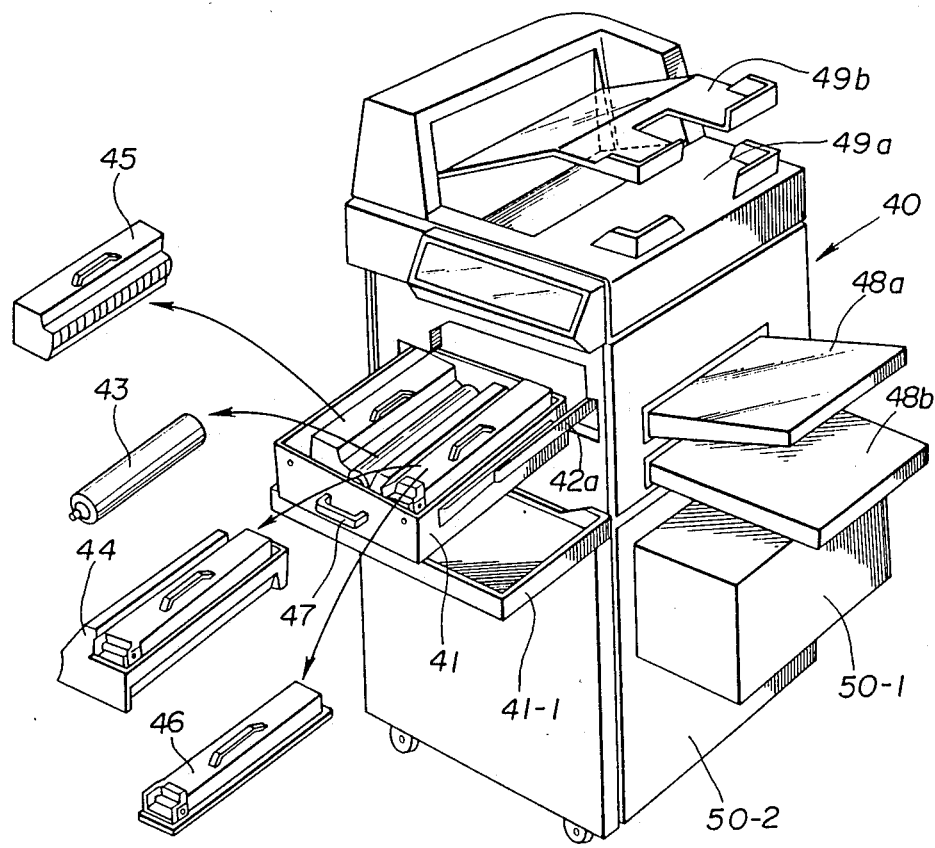
FIG. 6 is a perspective view showing the first embodiment of the image forming apparatus according to the present invention in a state where a drawer holding an image forming unit (replaceable unit) is pulled out from a main printer body.
Figure 7:
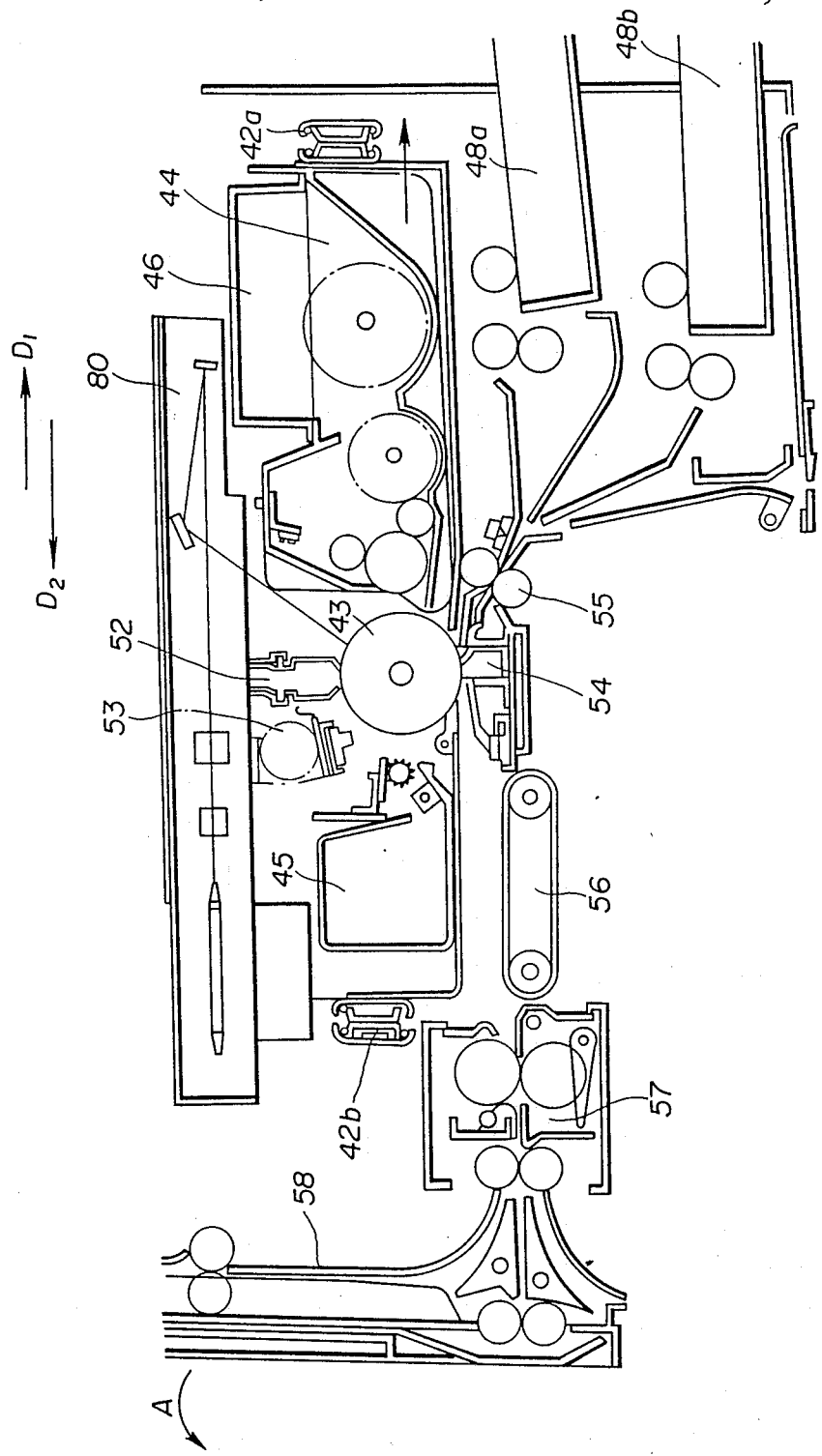
FIG. 7 is a cross sectional view showing a portion of the drawer of the laser printer shown in FIG.6.

FIG. 6 shows a perspective view of the laser printer in a state where a drawer 41 holding an image forming unit (replaceable unit) is pulled out from a main printer body 40. FIG. 7 shows a portion of the drawer 41 in cross section.

As shown in FIGS. 6 and 7, the drawer 41 is provided on a side of the main printer body 40 slidable along guide rail mechanisms 42a and 42b. A photosensitive unit 43, a developing unit 44, a cleaning unit 45, a toner cartridge 46 and the like constituting an image forming unit are accommodated in the drawer 41. These units 43 through 46 and the like are detachably accommodated in the drawer 41 an positioned with a certain accuracy to satisfy a predetermined positional relationship when the drawer 41 is pushed into an operative position in the main printer body 40, so that the recording operation according to the electrophotography method can be carried out correctly. The units 43 through 46 are also positioned to maintain an appropriate positional relationship with the optical unit 80, a charger unit 52, a discharge lamp 53, a transfer charger 54, a resist roller 55 and the like provided on the main printer body 40.

When the drawer 41 is pulled out of the main printer body 40 from an inserted position in the printer body 40 to a pulled-out position, the developing unit 44 and the toner cartridge 46 are automatically separated toward a direction D1 in FIG. 7 with respect to the photosensitive unit 43, while the cleaning unit 45 is automatically separated toward a direction D2 in FIG. 7 with respect to the photosensitive unit 43, as is described below. Hence, the units 44 and 45 automatically separate from each other when the drawer 4 is pulled out of the main printer body 40, and slight marginal spaces are formed between any two mutually adjacent units to facilitate the removal of each unit when the serviceable life thereof ends ad a replacement needs to be introduced. In addition, the possibility of damaging the units during the removal and setting of the unit is greatly reduced because of the slight marginal space.

A handle 47 is provided on a front surface of the drawer 41 to facilitate the pulling out of the drawer 41. Handles are also provided on the developing unit 44, the cleaning unit 45, the toner cartridge 46 and the like as shown in FIG. 6. However, for convenience sake, the illustration of these handles are omitted in FIG. 7 to simplify the drawings.

The main printer body 40 comprises in addition to the drawer 41 accommodating the image forming unit, the optical unit 80 and the like as above described, a first paper supplying cassette 48a and a second paper supplying cassette 48b for supplying paper, a fixing unit 57 for fixing the toner image on the paper developed by the image forming unit, a transport part 56 and the like. In addition, a first ejecting tray 49a and second ejecting tray 49b are provided on an upper portion of the main printer body 40 for receiving the recorded paper ejected by way of the transport part 56.

The main printer body 40 is arranged on an option unit 50-2 which is provided according to the needs of the user. The option unit 50-2 is made up of an independent paper supplying unit 50-1 for supplying a large quantity of paper, and a reversing unit (not shown). The reversing unit is used to reverse the side of the recorded paper having one side thereof recorded at the fixing unit 57, so as to supply the reversed paper back to the image forming unit for recording on the other side.

A cover 41-1 is closed upwardly in FIG. 6 when the drawer 41 is pushed into the operative position in the main printer body 40. The closed cover 41-1 prevents dust particles and the like from entering the main printer body 40, and also improves the external appearance of the laser printer.

Figure 8:
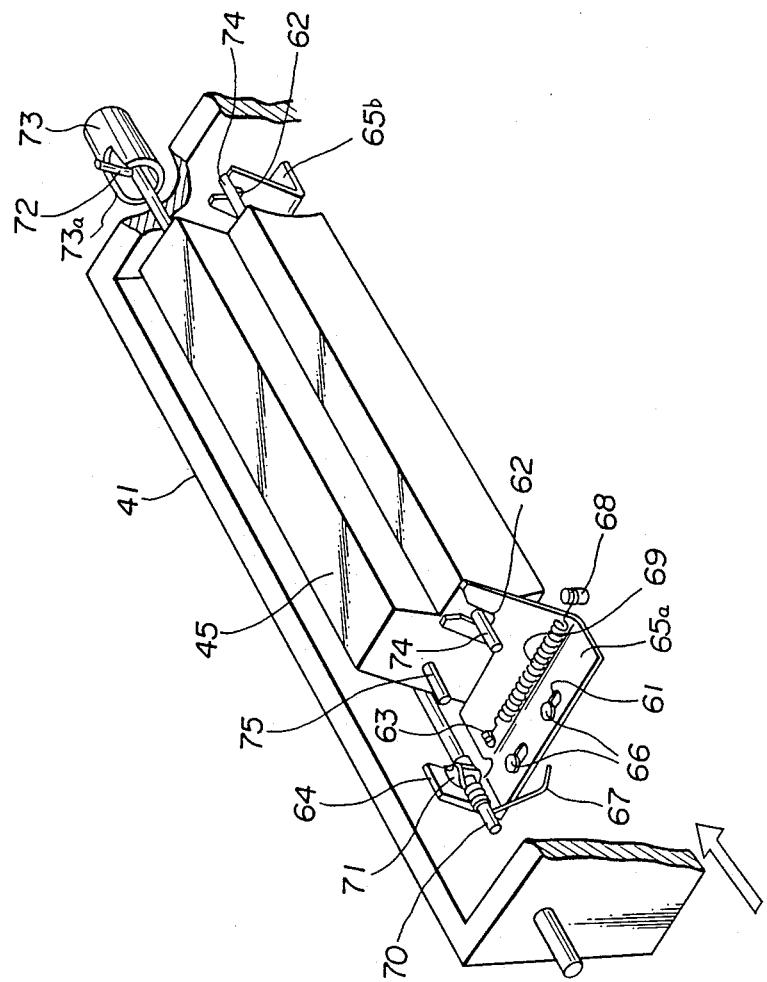
FIGS. 8 and 9 are a perspective view and a side view respectively showing an essential part of a mechanism for separating a cleaning unit from a photosensitive unit when a drawer is pulled out of the main printer body.
Figure 9:
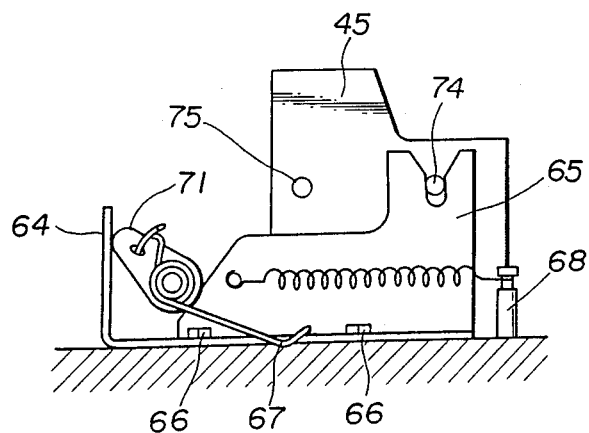

FIGS. 8 and 9 show an essential part of a mechanism for separating the cleaning unit 45 from the photosensitive unit 43 as the drawer 41 is pulled out of the main printer body 40. A pair of sliders 65a and 65b are respectively arranged at the front and rear of the drawer 41 along the pull-out direction (arrow direction in FIG. 8) of the drawer 41. The slider 65a has elongated holes 61, a cutout 62 for holding the cleaning unit 45, a pin 63 for supporting a coil spring 69, and a cam contact part 64. The sliders 65a and 65b are mounted on the drawer 41 by guide pins 66 in a slidable state with respect to the drawer 41. The coil spring 69 is provided between the in 63 on the slider 35a and a spring support pin 68 mounted on a bottom portion of the drawer 41. The slider 65b essentially has the same construction as the slider 65a, and a description thereof will be omitted.

A rod 70 is rotatably mounted on plates provided on the front and rear of the drawer 41, and a cam 71 is fixed on the rod 70 at a position corresponding to a position of the cam contact part 64 of the slider 65a. A torsion spring 67 is fit on the rod 70 and mounted so as to urge the rod 70 to rotate about the axis thereof. Although not shown in FIG. 8, a similar cam and torsion spring are provided with respect to the slider 65b. A pin 72 for engaging a cam 73 provided on the main printer body 40 is located on the rear end portion of the rod 70.

Figure 10:
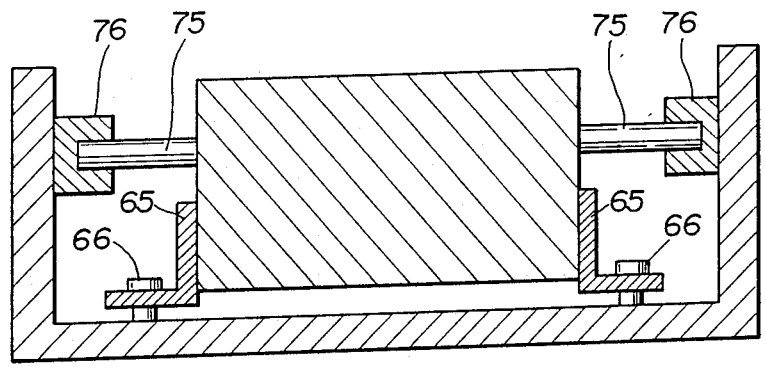
FIG. 10 is a cross sectional view showing a mechanism for supporting the cleaning unit on the drawer.
Figure 11:
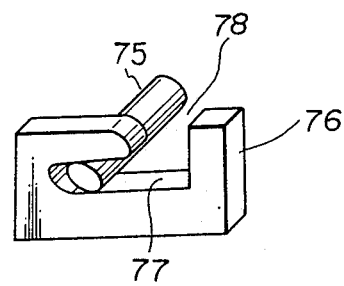
FIG. 11 is a perspective view showing a pin support.

The cleaning unit 45 has four pins provided on both sides and at the front and rear thereof. Of these four pins, the two pins 74 shown in FIG. 8 fit into the respective cutouts 62 of the sliders 65a and 65b and are held thereby. As shown in FIG. 10, remaining two pins 75 of the cleaning unit 45 are held by respective pin supports 76 provided on side walls of the drawer 41. And, as shown in FIG. 11, the pin supports 76 each have a substantially L-shaped hole 77 having an upper cutout portion 78.

When the drawer 41 which holds the image forming unit described heretofore is pushed in the arrow direction of FIG. 8 into the operative position in the main printer body 40, the pin 72 at the end of the rod 70 is also moved into the main printer body 40 to make contact with the cam surface 73a of the cam 73 of the main printer body 40 resulting in clockwise rotation of rod 70. In this state, the torsion spring 67 cannot rotate the rod 70 in a counterclockwise direction (as seen in FIG. 9) to press the cam 71 against contact part 64. For this reason, only the resilient forces of the coil springs 69 effectively act on the sliders 65a and 65b, thereby positioning the cleaning unit 45 supported by the sliders 65a and 65b close to the photosensitive unit 43, that is, at the original operative position of the cleaning unit 45. Therefore, the cleaning unit 45 is restricted to a position (reference position) which is fully to the right in FIG. 8 due to the action of the coil spring 69.

On the other hand, when the drawer 41 is pulled out of the main printer body 40, the pin 72 on the end of the rod 70 escapes the cam 73 and the rotational force of the torsion spring 67 acts on the cam 71 to push the cam contact part 64 of each of the sliders 65a and 65b. The spring force exerted by the torsion spring 67 is greater tan that exerted by the coil spring 69 and for this reason the sliders 65a and 65b slide to the left in FIG. 8. As a result, the cleaning unit 45 can easily be removed from the photosensitive unit 43 by pulling up o the pins 74 of the cleaning unit 45.

The description given heretofore relates to the removal of the cleaning unit 45, but the replacement by a new cleaning unit can be performed in a reverse sequence. Furthermore, a mechanism similar to that described for the cleaning unit 45 may be used for the developing unit 44 so as to facilitate the removal of the developing unit 44 from the photosensitive unit 43 as the drawer 41 is pulled out of the main printer body 40.

In the described embodiment, the automatic separation of the units on the drawer 41 as the drawer 41 is pulled out of the main printer body 40 is achieved by use of a combination of a plurality of cam mechanisms which detect the position of the drawer 41 and slide one or more units depending on the detected position of the drawer 41. However, other means such as a solenoid mechanism may be used in place of the cam mechanisms. In this case, one or more units can be slid by the solenoid mechanism depending on an electrical detection of the position of the drawer 41.

Therefore, the laser printer having such an easy access system for replacing the units is especially suited for the image forming apparatus of the present invention having the easily replaceable optical unit.

Of course, it is necessary to open an ejecting paper transport path part 58 shown in FIG. 7 in the direction A before the optical unit 80 can be inserted into and extracted from the receiving part 100 in the directions D1 and D2.

Figure 12:
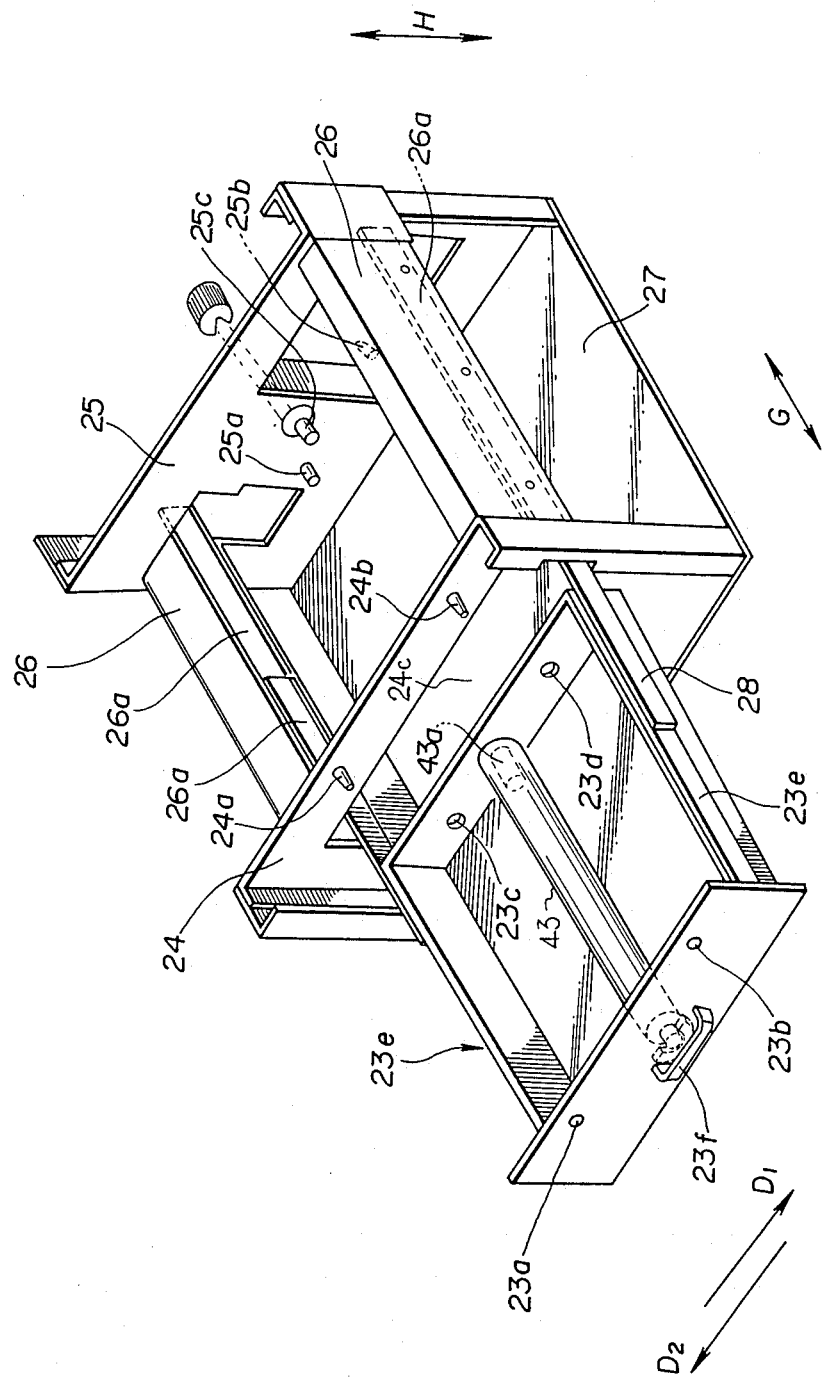
FIG. 12 is a perspective view showing an essential part of the drawer and the mechanism for enabling the insertion and extraction of the drawer 41 into and from the laser printer shown in FIG. 6.

FIG. 12 is a perspective view showing an essential part of the drawer 41 and the mechanism for enabling the insertion and extraction of the drawer 41 into and from the laser printer shown in FIG. 6 in a direction G which is perpendicular to the directions D1 and D2. The main printer body 40 comprises an outer plate 24, an inner plate 25, stays 26 which connect the inner and outer plates 25 and 24, and a bottom plate 27. Studs 24a and 24b for positioning the drawer 41 are provided on the outer plate 24, while studs 25a and 25b for positioning the drawer 41 are provided on the inner plate 25. The studs 24a, 24b, 25a and 25b are provided at positions accurately corresponding to the photosensitive unit 43 and the horizontal scanning plane of the optical scanning device. An opening 24c through which the drawer 41 is inserted into and extracted from the laser printer is formed in the outer plate 24. A drum driving shaft 25c for driving the photosensitive unit 43 (that is, photosensitive drum) is arranged to extend through the inner plate 25. A guide rail 26a is fixed on inner surfaces of each of the stays 26.

The drawer 41 has holes 23a and 23b for respectively receiving the studs 24a and 24b, and holes 23c and 23d for respectively receiving the studs 25a and 25b. When the drawer 41 is fully inserted into the inserted position in the laser printer, the drawer 41 is correctly positioned three-dimensionally in the directions D1 and D2, the direction G and the direction H. A guide rail 23e is formed on both sides of the drawer 41, and a handle 23f is provided at the front of the drawer 41 to facilitate the insertion and extraction thereof.

A pair of rods 28 are guided by the guide rails 26a and 23e. Stoppers (not shown) are provided on the rods 28, for example, so that one end of each rod 28 will not escape the guide rail 26a and the other end of the rod 28 will not escape the guide rail 23e when the drawer 41 is pulled out to the limit. The rod 28 in cooperation with the guide rails 26a and 23e makes it possible to pull out the drawer 41 from the laser printer in its entirety. Each of the guide rail mechanisms 42a and 42b shown in FIG. 7 are constituted by the guide rails 26a and 23e and the rod 28.

When putting the drawer 41 back into the laser printer, the user (or serviceman) pushes the handle 23f in the direction G. The drawer 41 is smoothly inserted into the laser printer under the guidance of the guide rails 26a, 23a and the rods 28, and the studs 24a and 24b fit into the respective holes 23a and 23b while the studs 25a and 25b fit into the respective holes 23c and 23d. As a result, the drawer 41 is correctly positioned three-dimensionally in the laser printer. In this state, the drum driving shaft 25c engages a hole 43a in the photosensitive unit 43 and the photosensitive unit 43 can be driven thereby. Hence, when the drawer 41 is fully inserted into the inserted position in the laser printer, the drawer 41 is automatically correctly positioned three-dimensionally, and furthermore, the drum driving shaft 25c automatically engages the photosensitive unit 43.

The extraction of the drawer 41 from the laser printer is carried out in a reverse sequence to that above described.

Figure 13:
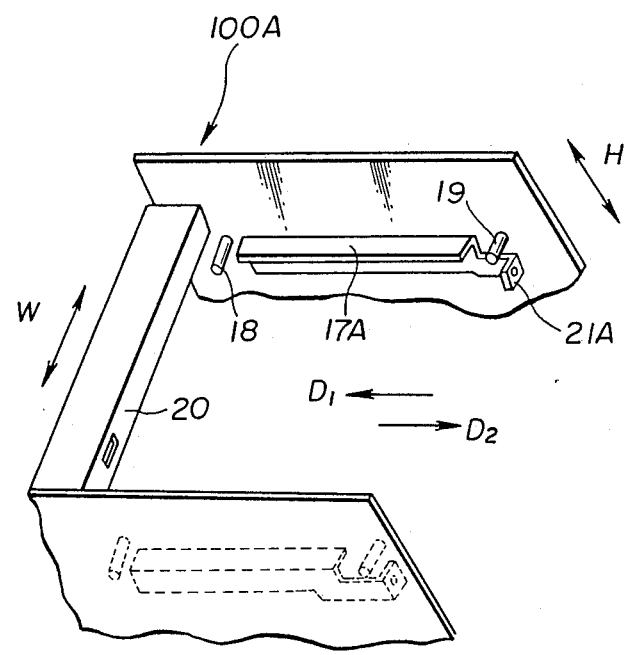
FIG. 13 is a perspective view showing a receiving part of a second embodiment of the image forming apparatus according to the present invention for receiving the optical unit.

Next, a description will be given of an essential part of a second embodiment of the image forming apparatus according to the present invention. FIG. 13 shows an essential part of a receiving part 100A of the present embodiment. In FIG. 13, those parts which are essentially the same as those corresponding parts in FIG. 3A are designated by the same reference numerals, and a description thereof will be omitted.

In FIG. 13, a guide rail 17A fixed on the inner surface of each of the side plates 16 integrally comprises an L-shaped portion 21A which functions as the L-shaped member 21 shown in FIG. 3A. Although not shown, the holes in the front plate the optical unit for receiving the mounting screws are located at positions corresponding to the locations of the L-shaped portions 21A.

Figure 14A:
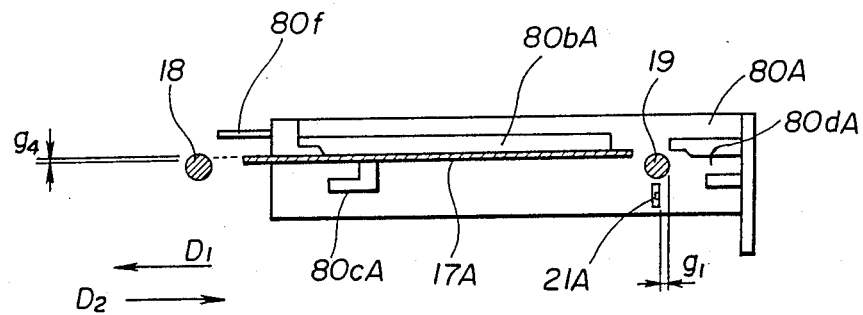
FIGS. 14A and 14B are side views in partial cross section respectively showing essential parts of the optical unit and the receiving part of the second embodiment for explaining the insertion and extraction of the optical unit.
Figure 14B:
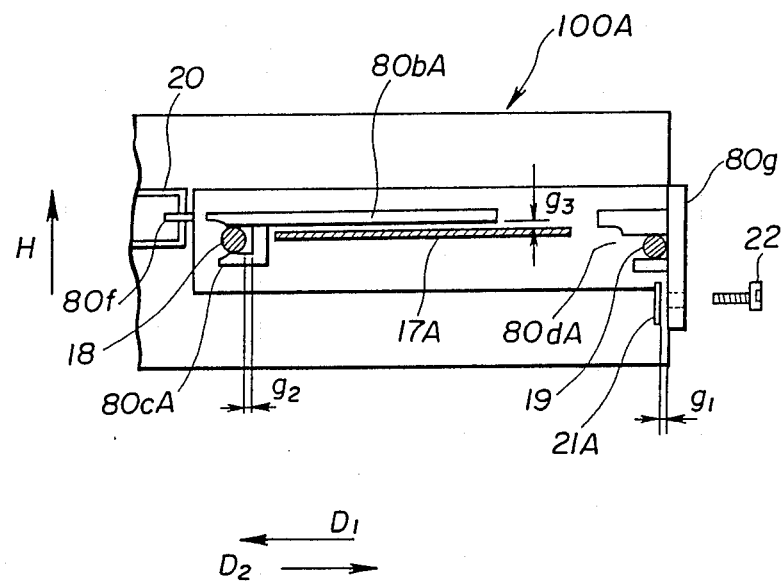

FIG. 14A shows the positional relationship of the receiving part 100A and an optical unit 80A in a state before the optical unit 80A is inserted into the fully inserted position in the receiving part 100A in the direction D1 (or partially extracted from the receiving part 100A in the direction D2). FIG. 14B shows the positional relationship of the receiving part 100A and the optical unit 80A in a state where the optical unit 80A is inserted into the fully inserted position in the receiving part 100A and is set in a position to carry out its function in the image forming apparatus. In FIGS. 14A and 14B, those parts which are essentially the same as those corresponding parts in FIGS. 5A and 5B are designated by the same reference numerals, and a description thereof will be omitted.

As may be seen from FIGS. 14A and 14B, a rib 80bA formed on the sidewall of the optical unit 80A extends in the directions D1 and D2 for a distance longer than the rib 80b of the first embodiment, and means forming a groove 80cA is connected to the rib 80bA. Means forming a groove 80dA is formed on the sidewall such that the stud makes contact with the rear surface of the front plate 80g when the optical unit 80A is inserted into the fully inserted position in the receiving part 100A. In FIG. 14A, the top of the stud 18 is higher than the top surface of the guide rail 17 by a distance g4.

Figure 15:
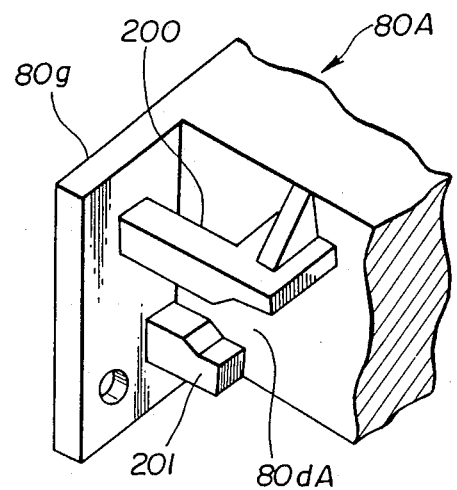
FIG. 15 is a perspective view showing a portion of the optical unit of the second embodiment on an enlarged scale in a vicinity of the groove.
Figure 16:
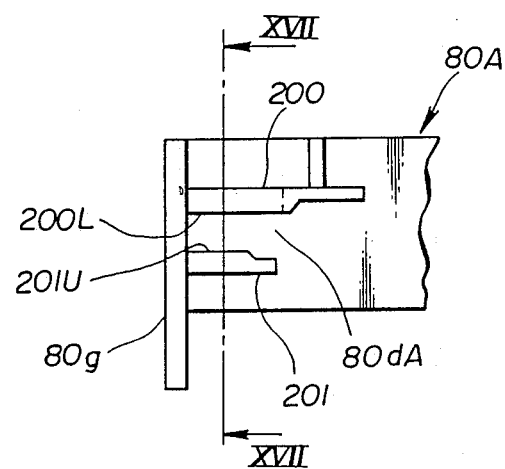
FIG. 16 is a side view showing the portion shown in FIG. 15.

FIG. 15 shows a portion of the optical unit 80A on an enlarged scale in a vicinity of the groove 80dA. FIG. 16 is a side view of the portion shown in FIG. 15, and FIG. 17 is a cross sectional view of the portion along a line XVI—XVI in FIG. 16 together with upper and lower dies for explaining the formation of the groove by a molding process.

The groove 80dA is defined by ribs 200 and 201 formed on the sidewall of the optical unit 80A. The rib 200 has an approximate L-shape. A lower surface 100L of the rib 200 and an upper surface 201U of the rib 201 determine the accuracy with which the optical unit 80A is positioned in the image forming apparatus with respect to other units of the image forming apparatus. Accordingly, it is essential that the surfaces 200L and 201U are formed with a high precision.

From the point of view of forming the surfaces 200L and 201U with a high precision, it is desirable to form these surfaces 200L and 200U by a molding process using upper and lower dies 210 and 211 shown in FIG. 17. A portion 80Ap corresponds to the portion of the optical unit 80A scan along the line XVII—XVII in FIG. 16. The upper and lower dies 210 and 211 form first and second reference planes RP1 and RP2 simultaneously as the formation of the surfaces 200L and 201U. The lenses, mirrors and the like of the optical unit 80A are positioned with reference to the first and second reference planes RP1 and RP2.

Because the surfaces 200L and 201U are molded by the same upper and lower dies 210 and 211 as form reference planes RP1 and RP2, the surfaces 200L and 201U can be formed with a high precision with respect to the lenses, mirrors and the like which are positioned with reference to the first and second reference planes RP1 and RP2 as compared to the case where the surfaces 200L and 201U are formed afterwards in a process subsequent to the formation of the reference planes RP1 and RP2. This is because surfaces S0 and S1 of the dies 210 and 21 which form the surfaces 200L and 2201U and surfaces SR1 and SR2 of the dies 210 and 211 which form the reference planes RP1 and RP2 can be made with a high precision. On the other hand, when the surfaces 200L and 201U are formed afterwards in the process subsequent to the formation of the reference planes RP1 and RP2, it is virtually impossible to maintain a high precision in the positional relationship of the surfaces 200L and 201U and the reference planes RP1 and RP2.

Figure 18A:
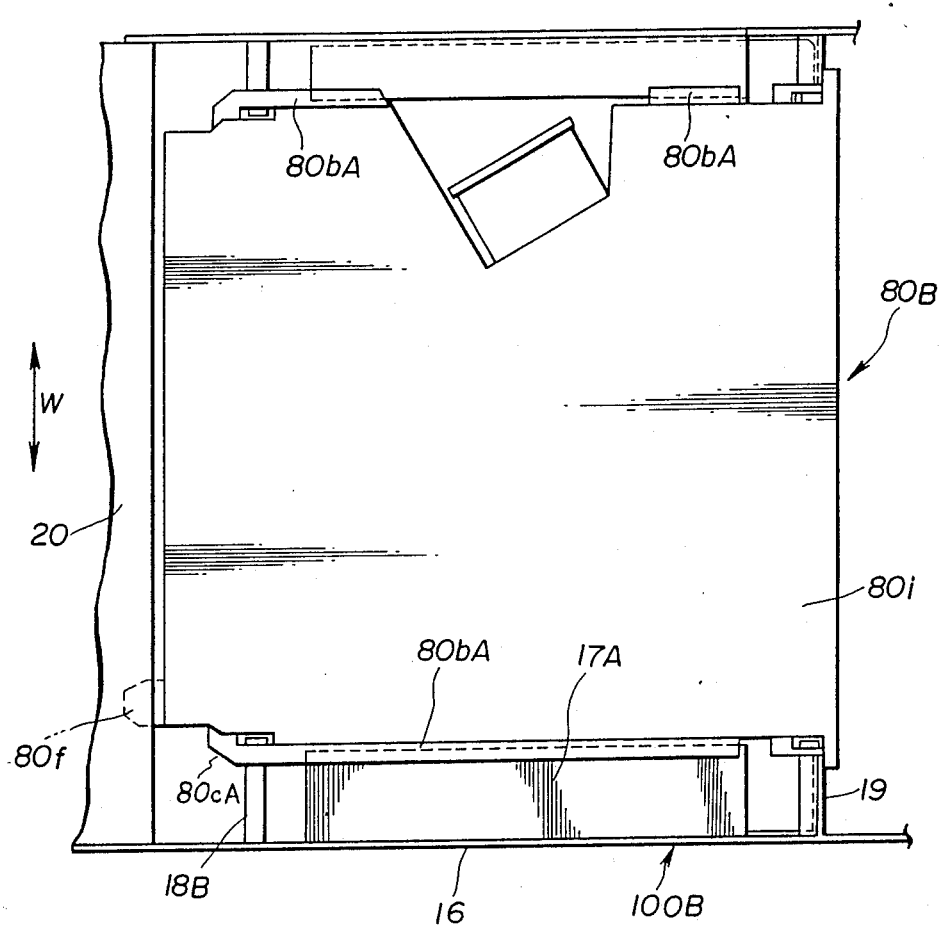
FIGS. 18A are respectively a plan view and a side view in cross section showing an essential part of a third embodiment of the image forming apparatus according to the present invention.
Figure 18B:
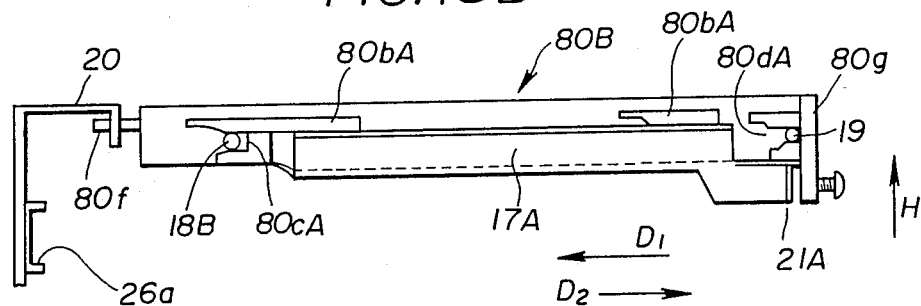

FIGS. 18A and 18B are a plan view and a side view respectively showing an essential part of a third embodiment of the image forming apparatus according to the present invention. In FIGS. 18A and 18B, those parts which are essentially the same as those corresponding parts in FIGS. 13, 14A and 14B are designated by the same reference numerals, and a description thereof will be omitted. FIGS. 18A and 18B show an optical unit 80B which is inserted into the fully inserted position in a receiving part 100B.

Figure 19:
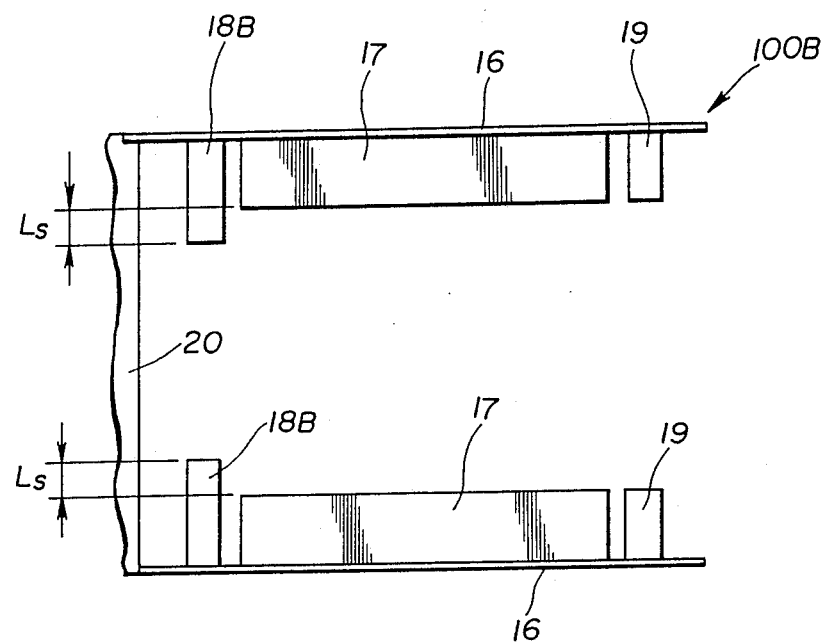
FIG. 19 is a plan view showing an essential part of a receiving part of the third embodiment.

As shown in FIGS. 18A and 18B, the width of the optical unit 80B in the direction W is smaller at the grooves 80cA than at other parts thereof. For this reason, studs 18B are longer than the studs 19 by a length Ls as shown in FIG. 19 so as to compensate for the smaller width of the optical unit 80B in the vicinity of the grooves 80cA. By making the width of the optical unit 80B narrower in the vicinity of the grooves 80cA, it is easier to insert the optical unit 80B into the receiving part 100B.

Figure 20:
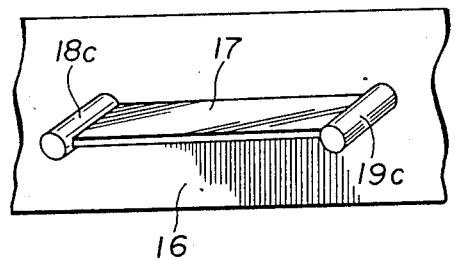
FIG. 20 is a perspective view showing an essential part of a receiving part of a fourth embodiment of the image forming apparatus according to the present invention.

FIG. 20 is a perspective view showing an essential part of a receiving part of a fourth embodiment of the image forming apparatus according to the present invention. According to this embodiment, the studs 18C and 19C are formed integrally on the guide rail 17.

Figure 21:
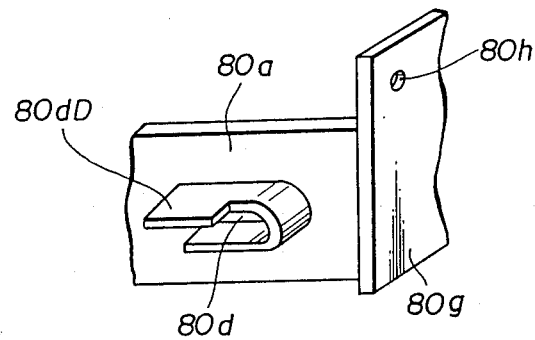
FIG. 21 is a perspective view showing an essential part of an optical unit of a fifth embodiment of the image forming apparatus according to the present invention.

FIG. 21 is a perspective view showing an essential part of an optical unit of a fifth embodiment of the image forming apparatus according to the present invention. According to this embodiment, a flange portion 80dD is formed at the groove 80d to increase the contact area with the corresponding stud of the receiving part. Hence, it is possible to more stably secure the optical unit in position.

Figure 22:
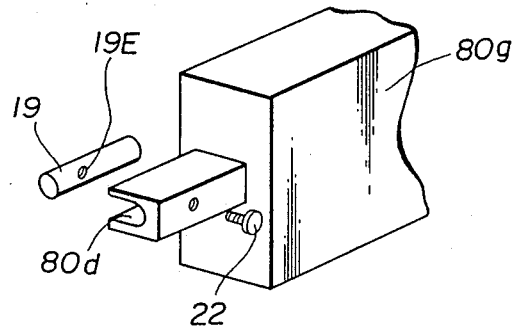
FIG. 22 is a perspective view showing an essential part of an optical unit of a sixth embodiment of the image forming apparatus according to the present invention.

FIG. 22 is a perspective view showing an essential part of an optical unit of a sixth embodiment of the image forming apparatus according to the present invention. According to this embodiment, the groove 80d is formed integrally on the front plate 80g. In addition the mounting screw 22 is screwed into a hole 19E in the stud 19 to fix the optical unit on the receiving part. In this case, no screw hole is formed in the front plate 80g.

Figure 23:
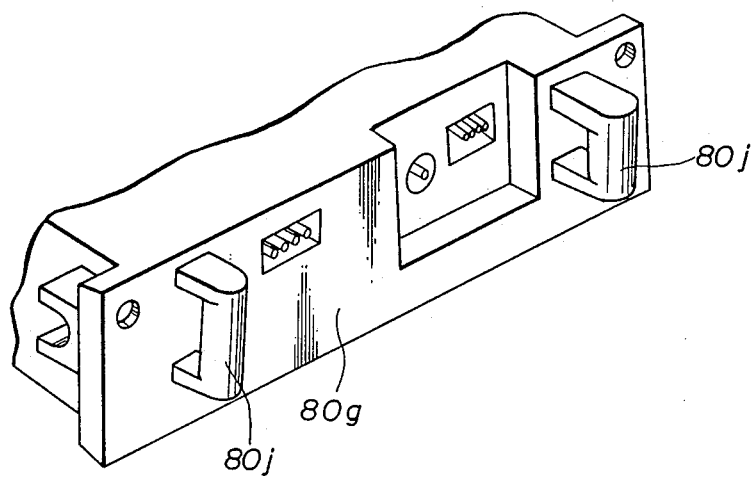
FIGS. 23 and 24 are perspective views respectively showing essential parts of optical units of seventh and eighth embodiments of the image forming apparatus according to the present invention.
Figure 24:
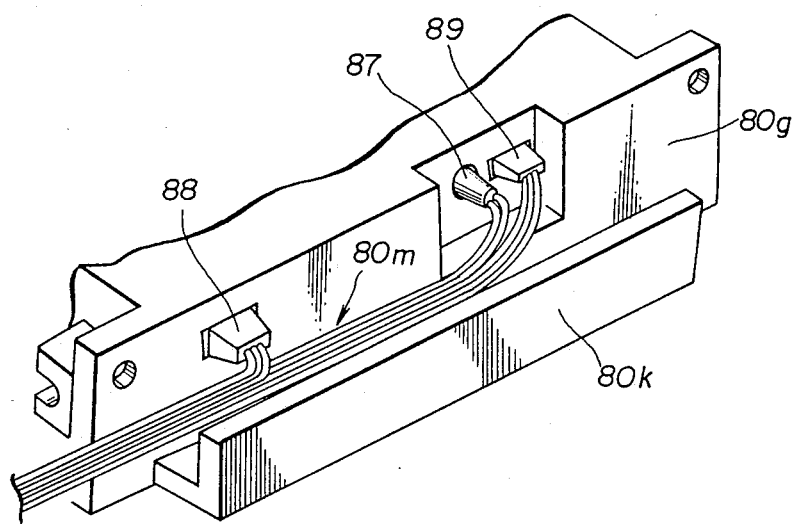

FIGS. 23 and 24 are perspective views showing essential parts of optical units of seventh and eighth embodiments of the image forming apparatus according to the present invention, respectively. In FIGS. 23 and 24, those parts which are essentially the same as those corresponding parts in FIG. 3B are designated by the same reference numerals, and a description thereof will be omitted.

In FIG. 23, handles 80j are provided on the front plate 80g of the optical unit to facilitate the insertion and extraction of the optical unit to and from the receiving part of the image forming apparatus.

In FIG. 24, a handle 80k is provided on the front plate 80g of the optical unit to facilitate the insertion and extraction of the optical unit to and from the receiving part of the image forming apparatus. According to the present embodiment, the cables can be arranged within a space 80m formed between the front plate 80g and the handle 80k.

The second through eighth embodiments basically provide the sam accurate and automatic three-dimensional positioning of the optical unit when the optical unit is inserted into the fully inserted position in the receiving part of the image forming apparatus.

The optical unit made easily replaceable in the present invention is not limited to the embodiments described heretofore. For example, the replaceable optical unit may comprise a light emitting diode (LED) array which forms an image on a photosensitive unit through an imaging optical system, or a light source and a liquid crystal shutter which form an image on a photosensitive unit, similarly as in the case of the described embodiments. In such cases, the optical unit must also be accurately positioned with respect to the other units of the image forming apparatus to ensure the formation of an image having a satisfactory picture quality Hence, the optical unit can be designed as in the described embodiments to accurately and automatically position the optical unit when the optical unit is inserted into the fully inserted position in the receiving part of the image forming apparatus. The use of the LED array and the liquid crystal shutter for image formation is known, and illustration and detailed description thereof will be omitted in the present specification.

Further, the present invention is not limited to these embodiments, but various variations and modifications may be made without departing from the scope of the present invention.

What is claimed is:

1. An electrophotographic image forming apparatus for forming an image described by input image information and having an apparatus body, said image forming apparatus comprising:
a receiving part positionable in a fixed position in the image forming apparatus body and having first positioning means;
a photosensitive unit having a fixed position relative to said receiving part; and
a replaceable optical unit positionable in a fully inserted position in said receiving part where said replaceable optical unit has a predetermined positional relationship relative to said photosensitive unit, said replaceable optical unit having second positioning means and imaging means for forming an electrophotographic image on said photosensitive unit when said replaceable optical unit is in the fully inserted position, said first and second positioning means cooperatively comprising means for correctly automatically positioning said replaceable optical unit three-dimensionally with respect to said photosensitive unit when said replaceable optical unit is in said fully inserted position in said receiving part,
said replaceable optical unit including a laser light source, a polygonal mirror for deflecting a laser beam from said laser light source, and said imaging means including lenses and mirrors for forming the image on said photosensitive unit.

2. An image forming apparatus as claimed in claim 1 including guide means for guiding said optical unit for movement along a first direction into and out of said fully inserted position, in which said first positioning means comprises first, second and third positioning parts and said second positioning means comprises fourth, fifth and sixth positioning parts, said first and fourth positioning parts cooperatively comprising means for positioning said replaceable optical unit in the first direction and in a second direction along a height thereof and perpendicular to the first direction, said first direction being along a depth of said replaceable optical unit, said second and fifth positioning parts cooperatively comprising means for positioning said replaceable optical unit in the second direction, said third and sixth positioning parts cooperatively comprising means for positioning said replaceable optical unit in a third direction along a width thereof and perpendicular to the first direction.

3. An image forming apparatus as claimed in claim 2 in which said receiving part comprises a frame with side plates and a rear member and said replaceable optical unit has an approximately rectangular shape with a front surface, side surfaces and a rear surface, said first and second positioning parts comprising studs formed on the side plates of said receiving part and extending inwardly of the receiving part along the third direction, said third positioning part comprising a hole formed in the rear member of said receiving part, said fourth and fifth positioning part comprising grooves formed at the side surfaces of said replaceable optical unit for engaging the studs, said sixth positioning part comprising a projection formed on the rear surface of said replaceable optical unit and extending in the first direction for engaging the hole.

4. An image forming apparatus as claimed in claim 3 in which said guide means comprise guide rails provided on the side plates of said receiving part and ribs provided on the side surfaces of said replaceable optical unit, each said rib being in contact and guided by one of said guide rails when said replaceable optical unit is inserted and extracted to and from said receiving part in the first direction, wherein each said rib is separating from a corresponding said guide rail in the second direction when said replaceable optical unit is inserted into the fully inserted position in said receiving part.

5. An image forming apparatus as claimed in claim 3 in which said stud comprising said first positioning part fully engages the corresponding groove of said fourth positioning part and said stud comprising said second positioning part partially engages the corresponding groove of said fifth positioning part when said replaceable optical unit is inserted into the fully inserted position in said receiving part, whereby a gap is formed in the first direction between an outer periphery of said stud comprising said second positioning part and a surface defining said groove comprising said fifth positioning part.

6. An image forming apparatus as claimed in claim 3 in which a width of said replaceable optical unit along the third direction in a vicinity of the rear surface thereof is smaller than that at other parts thereof, said stud of said first positioning part being located in a vicinity of a front of said receiving part, said stud of said second positioning part being located in a vicinity of the rear member of said receiving part, said stud of said second positioning part being longer than said stud of said first positioning part along the third direction.

7. An image forming apparatus as claimed in claim 4 in which said studs are integral parts of said guide rails.

8. An image forming apparatus as claimed in claim 3 in which said studs have an approximately cylindrical shape, and said grooves of said fourth and fifth positioning parts are defined by elements having approximately U-shaped surfaces.

9. An image forming apparatus as claimed in claim 3 in which said replaceable optical unit further comprises at least one handle provided on the front surface thereof.

10. An image forming apparatus as claimed in claim 3 in which said receiving part further comprises a screw receiving portion formed on the side plates thereof and said replaceable optical unit further comprises a screw hole in the front surface thereof, said replaceable optical unit being secured to said receiving part when inserted into the fully inserted position in said receiving part by a mounting screw which penetrates the front surface of said replaceable optical unit and engages the screw receiving portion.

11. An image forming apparatus as claimed in claim 10 in which a gap is formed along the first direction between the front surface of said replaceable optical unit and the screw receiving portion of said receiving part in a state where said replaceable optical unit is in said fully inserted position.

12. An image forming apparatus as claimed in claim 10 in which said stud of said first positioning part constitutes said screw receiving portion.

13. An image forming apparatus as claimed in claim 10 in which said guide means comprise guide rails provided on the side plates of said receiving part and ribs provided on the side surfaces of said replaceable optical unit, each said rib being in contact and guided by one of said guide rails when said replaceable optical unit is inserted and extracted to and from said receiving part in the first direction, wherein each said rib is separating from a corresponding said guide rail in the second direction when said replaceable optical unit is inserted into the fully inserted position in said receiving part.

14. An image forming apparatus as claimed in claim 13 in which said screw receiving portion is integrally formed on said guide rails.

15. An image forming apparatus as claimed in claim 1 in which said photosensitive unit and said replaceable optical unit are positioned with reference to a common frame constituting said receiving part.

16. An image forming apparatus as claimed in claim 2 including means for inserting and extracting said photosensitive unit into and from the fixed position in the image forming apparatus body in a direction perpendicular to the first direction, whereby said photosensitive unit is replaceable.

17. An image forming apparatus as claimed in claim 2 further comprising a drawer which is slidable in a direction perpendicular to the first direction and having an inserted position in the image forming apparatus body and a pulled-out position, said photosensitive unit being detachably accommodated within said drawer, said photosensitive unit being in the fixed position when said drawer is in the inserted position.

18. An image forming apparatus as claimed in claim 17 in which said drawer further detachably accommodates at least one of a developing unit, a cleaning unit and a toner cartridge.

19. An image forming apparatus as claimed in claim 3 in which said replaceable optical unit further comprises at least one connector located at one of the front, side and rear surfaces thereof for connecting to means for transmitting and receiving signals including the input image information.

20. An image forming apparatus as claimed in claim 19 in which the one of the front, side and rear surfaces where the connector is located has a recess for accommodating the connector, thereby preventing the connector from projecting from the one surface.

21. An image forming apparatus as claimed in claim 19 in which the connector is an electrical connector.

22. An image forming apparatus as claimed in claim 19 in which the connector is an optical connector.

23. An image forming apparatus as claimed in claim 18 including means for separating said photosensitive unit from said one of said developing unit, said cleaning unit and said toner cartridge only when said drawer is in said pulled out position.

24. An electrophotographic image forming apparatus for forming an image described by input image information and having an apparatus body, said image forming apparatus comprising:
   a receiving part positionable in a fixed position in the image forming apparatus body and having guide means;
   a photosensitive unit having a fixed position relative to said receiving part; and
   a replaceable optical unit positionable in a fully inserted position in said receiving part where said replaceable optical unit has a predetermined positional relationship relative to said photosensitive unit, said replaceable optical unit having an approximately rectangular shape and including imaging means for forming an electrophotographic image on said photosensitive unit when said optical unit is in the fully inserted position, wherein said replaceable optical unit can slide in a predetermined direction under guidance of said guide means when said being inserted and extracted to and from said receiving part,
   said replaceable optical unit including a laser light source, a polyonal mirror for deflecting a laser beam from said laser light source, and said imaging means including lenses and mirrors for forming the image on said photosensitive unit.

25. An electrophotographic image forming apparatus for forming an image described by input image information and having an apparatus body, said image forming apparatus comprising:
   a receiving part positionable in a fixed position in the image forming apparatus body and having guide means;
   a photosensitive unit having a fixed position relative to said receiving part; and
   a replaceable optical unit positionable in a fully inserted position in said receiving part where said replaceable optical unit has a predetermined positional relationship to said photosensitive unit, said replaceable optical unit having an approximately rectangular shape and including imaging means including lenses and mirrors for forming an electrophotographic image on said photosensitive unit when said optical unit is in the fully inserted position, predetermined surfaces of said replaceable optical unit which determine a positioning thereof in the fully inserted position with respect to said photosensitive unit being molded from dies simultaneously with formation of reference planes on which are positioned the lenses and mirrors of said imaging means in said replaceable optical unit.

* * * * *